(12) United States Patent
Kim et al.

(10) Patent No.: US 10,324,933 B2
(45) Date of Patent: Jun. 18, 2019

(54) TECHNIQUE FOR PROCESSING QUERY IN DATABASE MANAGEMENT SYSTEM

(71) Applicant: TmaxData Co., Ltd., Gyeonggi-do (KR)

(72) Inventors: Yongkwon Kim, Gyeonggi-do (KR); Youngjae Choi, Gyeonggi-do (KR); Bongchae Kang, Jeju-do (KR); Yeseul Kim, Gyeongsangbuk-do (KR)

(73) Assignee: TmaxData Co., Ltd., Gyeonggi-do (KR)

( * ) Notice: Subject to any disclaimer, the term of this patent is extended or adjusted under 35 U.S.C. 154(b) by 364 days.

(21) Appl. No.: 15/221,307

(22) Filed: Jul. 27, 2016

(65) Prior Publication Data
US 2018/0025058 A1 Jan. 25, 2018

(30) Foreign Application Priority Data
Jul. 19, 2016 (KR) .................. 10-2016-0091201

(51) Int. Cl.
*G06F 17/30* (2006.01)
*G06F 16/2455* (2019.01)
*G06F 16/22* (2019.01)

(52) U.S. Cl.
CPC .... *G06F 16/24561* (2019.01); *G06F 16/2282* (2019.01)

(58) Field of Classification Search
CPC ............... G06F 17/30; G06F 17/30501; G06F 17/30339; G06F 16/24561; G06F 16/2282
USPC .................................... 707/600–899
See application file for complete search history.

(56) References Cited

U.S. PATENT DOCUMENTS

| 6,411,951 B1 | 6/2002 | Galindo-Legaria et al. |
| 2007/0219943 A1 | 9/2007 | Draughn, Jr. |
| 2014/0101130 A1* | 4/2014 | Kang ............... G06F 17/30466 707/714 |

FOREIGN PATENT DOCUMENTS

EP 1 350 184 B1 11/2014

* cited by examiner

*Primary Examiner* — Isaac M Woo
(74) *Attorney, Agent, or Firm* — Martin & Ferraro, LLP

(57) ABSTRACT

Disclosed is a method for processing a query in a database management system (DBMS). The method includes: receiving a main query including a subquery; identifying an indication to independently manage a processing result for the subquery in the received main query by parsing the received main query—the indication including storing type information for the processing result of the subquery; determining a storing type for independently storing the processing result for the subquery based on the indication; and storing the processing result for the subquery independently from the processing result for the main query while performing processing for the main query according to the determined storing type.

11 Claims, 6 Drawing Sheets

TECHNIQUE FOR PROCESSING QUERY IN DATABASE MANAGEMENT SYSTEM

CROSS-REFERENCE TO RELATED APPLICATIONS

This application claims priority to and the benefit of Korean Patent Application No. 10-2016-0091201 filed in the Korean Intellectual Property Office on Jul. 19, 2016, the entire contents of which are incorporated herein by reference.

TECHNICAL FIELD

The present disclosure relates to a database management system (DBMS), and more particularly, to a technique for processing a query in the DBMS.

BACKGROUND ART

A business of an enterprise has been rapidly expanded due to an explosive increase of data and the appearance of various environments and platforms. With the advent of a new business environment, more efficient and flexible processing of a data service and information and data management function are required. According to such a change, a research into a database for solving problems in high performance, high availability and extensibility which are a basis of enterprise business implementationhas continued.

In the database management system (DBMS), data can be stored in a data storage. In a relational database management system (RDBMS), the data storage may be designated as a table. The table can include one or more rows and each of one or more rows can include one or more columns.

A query language for a database as a structured query language (SQL) can be used to construct and utilize the database. The SQL can include a data definition language (DDL) and a data manipulation language (DML).

In a conventional SQL grammar, in order to verify a result for a subquery, the result cannot but be separately verified by separately performing the corresponding subquery apart from a main query. For example, a result of a specific query for the database may be abruptly abnormal. In this case, inspecting multiple tables included in the specific query is required to verify a cause of the abnormal result. The inspection can generally be performed by a scheme that inspects a table(s) associated with respective sub queries while individually performing only a subquery for a complicated query. However, such a scheme may not be appropriate under environments described below.

A first environment is a case in which the query is performed in an application. In this case, it may not be easy to configure an environment which is the same as an environment in which the query result is abnormal.

A second environment is a case in which the query is very complicated. A situation in which it is difficult to independently separate the query like a correlated subquery, or the like according to a type of query may occur. In this case, since the query is not a simple subquery type, it is not easy to verify contents.

A third environment is a case in which a lot of time is required for processing the query. In the case of a complicated query which accesses the multiple tables, even though the main query is divided into the sub queries to be respectively performed, a time which is approximately several times longer than a total execution time is required.

SUMMARY OF THE INVENTION

The present disclosure has been made in an effort to easily verify a result of a desired subquery while performing a main query.

An exemplary embodiment of the present disclosure provides a method for processing a query in a database management system (DBMS). The method includes: receiving a main query including a subquery; identifying an indication to independently manage a processing result for the subquery in the received main query by parsing the received main query—the indication including storing type information for the processing result of the subquery; determining a storing type for independently storing the processing result for the subquery based on the indication; and storing the processing result for the subquery independently from the processing result for the main query while performing processing for the main query according to the determined storing type.

Another exemplary embodiment of the present disclosure provides a computer program stored in a computer-readable recording medium. The computer program may be configured to perform following operations for query processing in a database management system (DBMS) when the computer program is executed by one or more processors and the operations may include: an operation of receiving a main query including a subquery; an operation of identifying an indication to independently manage a processing result for the subquery in the received main query by parsing the received main query—the indication including storing type information for the processing result of the subquery; an operation of determining a storing type for independently storing the processing result for the subquery based on the indication; and an operation of storing the processing result for the subquery independently from the processing result for the main query while performing processing for the main query according to the determined storing type.

Still another exemplary embodiment of the present disclosure provides a server for processing a query in a database management system (DBMS). The server may include: a communication module receiving a main query including a subquery; a query parsing module identifying an indication to independently manage a processing result for the subquery in the received main query by parsing the received main query—the indication including storing type information for the processing result of the subquery; a storing type determining module determining a storing type for independently storing the processing result for the subquery based on the indication; an operation executing module of performing processing for the main query and processing for the subquery; and a storage module storing the processing result for the subquery independently from the processing result for the main query while performing processing for the main query according to the determined storing type.

According to exemplary embodiments of the present disclosure, a result of a desired subquery can be easily verified while performing a main query.

BRIEF DESCRIPTION OF THE DRAWINGS

Various aspects are now disclosed with reference to drawings and herein, similar reference numerals are used to designate generally similar elements. In the following embodiments, for the purpose of description, multiple specific details are presented to provide general understanding of one or more aspects. However, it will be apparent that the aspect(s) can be performed without the concrete details. In other examples, known structures and devices are illustrated in a block diagram form in order to facilitate description of one or more aspects.

DETAILED DESCRIPTION

Figure 1:
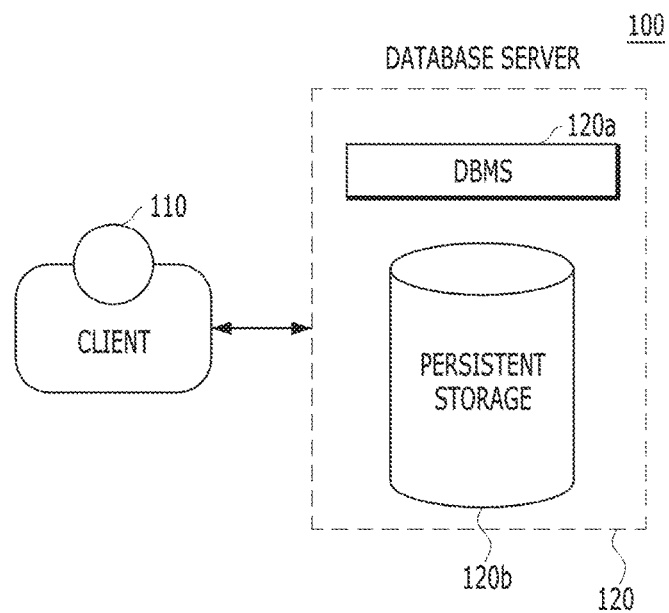
FIG. 1 is a schematic view of a database system according to an exemplary embodiment of the present disclosure.

Various exemplary embodiments and/or aspects are now disclosed with reference to drawings. In the following description, for description, multiple detailed matters are disclosed in order to help overall understanding of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some among various methods in principles of various aspects may be used and the descriptions are intended to include all of the aspects and equivalents thereof.

Various aspects and features will be presented by a system or a server which can include multiple devices, components, and/or modules. It should also be appreciated and recognized that various systems/servers can include additional devices, components, and/or modules and/or that the various systems/servers cannot include all of devices, components, modules, and the like discussed in association with the drawings.

In "embodiment", "example", "aspect", "illustration", and the like used in the specification, it may not be construed that a predetermined aspect or design which is described is more excellent or advantageous than other aspects or designs. "Server", 'component', 'module', 'system', 'interface', and the like which are terms used below generally mean computer-related entities and mean, for example, hardware, a combination of the hardware and software, and the software.

The term "or" is intended to mean not exclusive "or" but inclusive "or". That is, when not separately specified or not clear in terms of a context, the case where "X uses A or B" is intended to mean one of natural inclusive substitutions. That is, "X uses A or B" may be applied to either of the case where X uses A, the case where X uses B, or the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or not clear in terms of the context by indicating a singular form, it should be construed that the singular generally means "one or more" in the present specification and the claims.

The computer-readable medium in the present specification may include all kinds of storage media storing programs and data to be readable by the computer system. According to an aspect of the present disclosure, the media may include a read only memory (ROM), a random access memory (RAM), a compact disk (CD)-ROM, a digital video disk (DVD)-ROM, a magnetic tape, a floppy disk, an optical data storage device, and the like and also include media implemented in the form of a carrier wave (for example, transmission through the Internet). Additionally, the media are distributed to systems connected through network to store computer readable codes and/or commands in a distribution scheme.

Prior to describing detailed contents for carrying out the present disclosure, it should be noted that configurations not directly associated with the technical gist of the present disclosure are omitted without departing from the technical gist of the present disclosure. Further, terms or words used in the present specification and claims should be interpreted as meanings and concepts which match the technical spirit of the present disclosure based on a principle in which the inventor can define appropriate concepts of the terms in order to describe his/her disclosure by a best method.

FIG. 1 is a schematic view of a database system 100 according to an exemplary embodiment of the present disclosure.

As illustrated in FIG. 1, the database system 100 may include a client 110 and a database server 120.

As illustrated in FIG. 1, the client 110 may mean a node(s) in the database system having a mechanism for communication through a network. For example, the client 110 may include a PC, a laptop computer, a workstation, a terminal, and/or a predetermined electronic device having network accessibility. Further, the client 110 may include a predetermined server implemented by at least one of an agent, an application programming interface (API), and a plug-in. For example, the client 110 in FIG. 1 may be related with a user who uses the database server 120 (e.g., database administration (DBA)). In this example, the client 110 may issue a query statement including a subquery to the database server 120. For example, the main query may include a WITH clause and the subquery may be included in the WITH clause. Herein, a "client" may be used to be exchanged with a "user" or "DBA". In addition, herein, a "query statement" and an "SQL statement" may be used to be exchange with each other. Further, the "WITH clause" used in the present specification may be used to be exchanged with a "WITH AS clause". Moreover, the "subquery" used in the present disclosure may mean another SQL statement included in one SQL statement and may have a dependent relationship with the main query.

The database server 120 may include, for example, a predetermined type of computer system or computing device such as a microprocessor, a main frame computer, a digital single processor, a portable device, and a device controller. The database server 120 may include a database management system (DBMS) 120a and a persistent storage 120b. Further, the database server 120 may be used to mutually exchange with a device for executing the query.

In FIG. 1, only one database sever 120 is illustrated, but it will be apparent to those skilled in the art that more than one database server may also be included in the scope of the present disclosure and the database server 120 may include additional components. For example, although not illustrated in FIG. 1, the database server 120 may include one or more memories including a buffer cache. Further, although not illustrated in FIG. 1, the database server 120 may include one or more processors. Accordingly, the DBMS 120a may be operated by the processor on the memory.

In the present specification, the memory as a primary storage device which the processor directly accesses, such as a random access memory such as a dynamic random access memory (DRAM), a static random access memory (SRAM), or the like may mean a volatile storage device in which when power is turned off, stored information is instantaneously erased, but is not limited thereto. The memory may operate by the processor. The memory may temporarily store a data table including a data value. The data table may include the data value and in an exemplary embodiment of the present disclosure, the data value of the data table may be recorded in the persistent storage from the memory. In an additional aspect, the memory may include the buffer cache and data may be stored in a data block of the buffer cache. The data stored in the buffer cache may be recorded in the persistent storage by a background processor.

The persistent storage 120b means, for example, a non-volatile storage medium which continuously store predetermined data, such as storage devices based on a flash memory and/or battery-backup memory in addition to a magnetic disk, an optical disk, and a magneto-optical storage device. The persistent storage 120b may communicate with the processors and memories of the database server 120 through various communication means. In an additional exemplary embodiment, the persistent storage 120b is positioned outside the database server 120 to communicate with the database server 120.

The DBMS 120a as a program for permitting the database server 120 to perform operations such as parsing the query, searching, inserting, modifying, and/or deleting required data may be implemented by the processor in the memory of the database server 120 as described above.

The client 110 and the database server 120 or the database servers may communicate with each other through a network (not illustrated). A network according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in the present specification may adopt various wireless communication systems including code division multiple access (CDMA), time division multiple access (TDMA), frequency division multiple access (FDMA), orthogonal frequency division multiple access (OFDMA), single carrier-FDMA (SC-FDMA), and other systems. For example, the network may include a database link (dblink), and as a result, a plurality of database servers communicates with each other through the database link to bring data from another database server. The technologies described in the present specification may be used in other networks as well as the mentioned networks.

The "WITH clause" used in the present disclosure may be used for defining a specifically queried result set as one name and using the result set. The "WITH clause" may be primarily used as WITH~AS ( ) and a specific subquery may be stored in the memory as a virtual view. For example, when the main query including the subquery is "select * from (select c1, c2 from t) q1", the main query may be expressed by using the with clause like with q1 as (select c1, c2 from t) select * from q1.

When it is difficult to interpret the query only because multiple tables need to be joined to each other or when excessively many sub queries are used, the performance of the query may deteriorate. In this case, when the WITH clause is used, since a temporary table is generated in a temporary table space, the performance of the query may be enhanced and readability of the query may also be improved. When a repeated query is commonly used, a view is made and used. It is advantageous in that the WITH clause may be used by making the result set in the query without making a separate actual view.

According to the exemplary embodiment of the present disclosure, a technique may be implemented, which adds a specific function to the WITH clause to verify the result of the desired subquery in a predetermined form while performing the main query. The extended function for the WITH clause may be usefully used when a long and very complicated query is managed and when data interfacing in the database is determined.

Therefore, according to the exemplary embodiment of the present disclosure, since the database server 120 may separately manage the result of the subquery which is a part in the main query while performing the main query similarly to the related art, the database server 120 may have advantages described below. First, the corresponding subquery need not be performed repeatedly several times. Second, since the result of the subquery is separately stored/output in a file or table (alternatively, an in-memory column) form, post analysis may become easy. Third, a burden for conventional query modification required for verifying the result of the subquery may be reduced. Therefore, the query processing technique according to the exemplary embodiment of the present disclosure may be advantageous even in determining the data interfacing in the database as well as coping with the abnormal query result.

Figure 2:
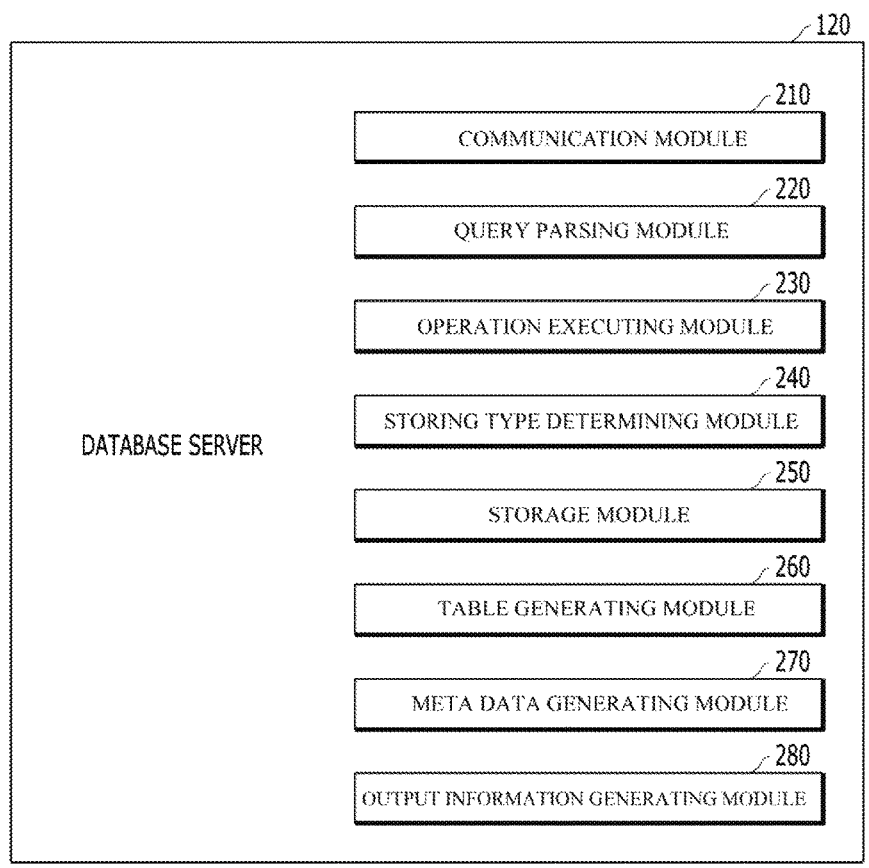
FIG. 2 is a schematic view of a database server according to an exemplary embodiment of the present disclosure.

FIG. 2 is a schematic view of a database server 120 according to an exemplary embodiment of the present disclosure.

As illustrated in FIG. 2, the database server 120 may include a communication module 210, a query parsing module 220, an operation executing module 230, a storing type determining module 240, a storage module 250, a table generating module 260, a meta data generating module 270, and an output information generating module 280. The components of the database server 120 illustrated in FIG. 2 are exemplary and predetermined components associated with an operation of the database server 120 may be added or some of the components may be omitted. The aforementioned modules may be configured to be executed by one or more processors of the database server 120 to perform a specific task.

In an exemplary embodiment of the present disclosure, the communication module 210 may provide a communication function with the client 110 or another database server to the database server 120. For example, the communication module 210 may communicate with another database serveror the client 110 by using the aforementioned predetermined network and/or database link. In addition, the communication module 210 may receive predetermine requests such as data storage, query and index build, a query request, and the like from the client 110 using the database server 120. Besides, the communication module 210 may transfer result information for the predetermined requests such as the data storage, query and index build, and the query request to the client 110 or another database server. Moreover, the communication module 210 may communicate with the another database server by a method which calls a procedure to the another database server. In more detail, the communication module 210 may receive a main query including a subquery. The main query may include a WITH clause and the subquery may be included in the WITH clause.

The query parsing module 220 may parse the main query received by the communication module 210. The query parsing module 220 may identify an indication to independently manage a processing result for the subquery in the main query through the parsing. Herein, the indication may include storing type information for the processing result of the subquery. The indication may be included in a statement expressed outside the subquery in the WITH clause. Additionally, the parsing module 220 identifies the indication included in the main query to determine in which scheme the processing result for the subquery is to be stored.

The operation executing module 230 may perform a predetermine database operation corresponding to the query statement in response to reception of the query statement. For example, the operation executing module 230 may execute a database operation corresponding to the main query and/or subquery. Further, the operation executing module 230 may execute a predetermined database operation generated in generating output information for the main query and/or subquery. Additionally, the operation executing module 230 may perform the predetermined database operation performed according to the determined storing type. Further, the operation executing module 230 may be configured to include at least one of the storing type determining module 240, the storage module 250, the table generating module 260, the meta data generating module 270, and the output information generating module 280 to be described below.

The storing type determining module 240 may determine the storing type for the processing result of the corresponding subquery according to the storing type information for the subquery processing result included in the indication identified by the parsing module 220. In the exemplary embodiment of the present disclosure, the storing type may include an internal storing type or an external storing type. Herein, the internal storing type may include, for example, a storing type that uses a storage (e.g., a memory) in the database, such as an output of a table form. Further, the external storing type may include, for example, a storing type that uses a storage (e.g., a persistent storage such as a disk) outside the database, such as an output of a file form.

The storage module 250 may store predetermined data stored in association with task execution of the database server 120. For example, the storage module 250 may be configured to store intermediate result data and/or final result data for the main query and/or subquery. The storage module 250 may be included in the DBMS 120a and/or the persistent storage 120b. Additionally, the storage module 250 may generate a database server 120 table and/or a meta table. As another example, the tables may be generated by a separate component such as the table generating module 260 described below. Further, the storage module 250 may process and manage a request associated with storage (including update) of data. The storage module 250 may decide to store predetermined data in a data table and an index table. Further, the storage module 250 may decide a storage position for the table. For example, the storage module 250 may decide a table (e.g., a read-only temporary table) position on the memory and a storage position on the table with respect to data. As another example, the storage module 250 may decide a storage position on an external file storage (e.g., the persistent storage 120b) with respect to the data.

Further, the storage module 250 may determine the external file storage in which the processing result for the subquery is to be stored in the file form. In addition, the storage module 250 may store meta data for reading a file stored in the determined external file storage in an external table in the memory. Moreover, the storage module 250 may be configured to store an intermediate result of the subquery processing in a meta table generated to independently store the intermediate result for the processing of the subquery.

The table generating module 260 may be configured to generate a table(s) required in a query processing procedure according to an aspect of the present disclosure. For example, the table generating module 260 may generate the external table which may be connected to the external file storage in the memory. Further, the table generating module 260 may generate the read-only temporary table in which the processing result for the subquery is to be stored in the table form in the memory when the storing type is determined as the internal storing type. In addition, the table generating module 260 may generate a meta table for storing at least one of storage position information for the stored subquery, SQL statement information for the subquery, time information when the processing result for the subquery is generated, and snapshot information for the processing result of the subquery in order to permit the processing result for the subquery which is independently stored to be reused. Further, the table generating module 260 may generate the meta table for independently storing the intermediate result of the processing for the subquery in the memory.

The meta data generating module 270 may generate predetermined meta data to be stored in the meta table. The meta data may include, for example, the storage position information for the subquery, the SQL statement information for the subquery, the time information when the processing result for the subquery is generated, and the snapshot information for the processing result of the subquery. Further, the meta data may include intermediate result data of the processing for the subquery. In addition, the meta data may include data for reading the file stored in the external file storage.

The output information generating module 280 may generate the output information in the table form or file form according to the query execution result according to an aspect of the present disclosure. The output information generating module 280 may generate output information of predetermined stored data in response to an output request from the DBA.

Figure 3:
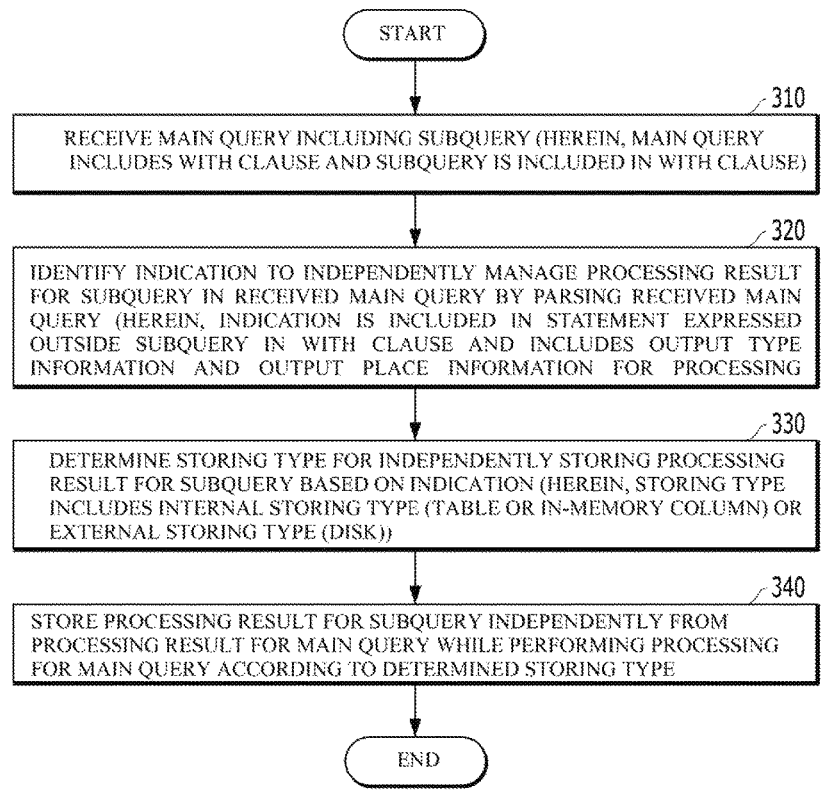
FIG. 3 is a flowchart of a method for processing a query according to an exemplary embodiment of the present disclosure.

FIG. 3 is a flowchart of a method for processing a query according to an exemplary embodiment of the present disclosure. Steps illustrated in FIG. 3 may be performed by for example, the database server 120. The steps illustrated in FIG. 3 are exemplary and additional steps may be included or at least some steps may be omitted.

The communication module 210 of the database server 120 may receive a main query including a subquery (310). Herein, the main query may include a WITH clause and the subquery may be included in the WITH clause.

For example, an exemplary main query (external storing type) including the subquery may be expressed as follows:
with dept_count as (select deptno, count(*) as dept_count
  from emp
  group by deptno)
ORGANIZATION EXTERNAL (DEFAULT DIRECTORY def_dir ACCESS PARAMETERS (fields terminated by '/')
LOCATION (dir1: 'dept.dat'))
select e.ename as employee_name,
  dc.dept_count as emp_dept_count from emp e, dept_count dc
where e.deptno=dc.deptno In the aforementioned exemplary main query, the subquery is included in parentheses below a with as clause and an expression "ORGANIZATION EXTERNAL" may correspond to an "indication to independently manage the processing result for the subquery" used in the present specification. Further, an expression "(DEFAULT DIRECTORY def_dir ACCESS PARAMETERS (fields terminated by '/') LOCATION (dir1: 'dept.dat'))" represents that the storing type is an "external storing type". Herein, an expression DEFAULT DIRECTORY def_dir represents that a name of a default directory in which a result file is stored is def_dir, an expression ACCESS PARAMETERS (fields terminated by '/') means that an access parameter of an external table is used and respective column values are distinguished by/in storing the processing result as the file, and an expression associated with LOCATION represents information on a stored file name in which the result file is stored. Herein, the external table is a virtual table which may be used like a general table in the database and an actual position and a storage space are present outside the database (e.g., in the persistent storage). The external table may be connected with an external file storage which is present outside the database and extract required meta data from the external file storage and store the extracted meta data.

In an additional exemplary embodiment, for example, an expression SPLIT KEYS(c1) may be added to a last part of the indication to independently manage the processing result of the subquery in the aforementioned main query. This may mean a split key column and represent that the result is output to a separate file with respect to the set column c1.

As another example, an exemplary main query (internal storing type) including the subquery may be expressed as follows:
with dept_count as (select deptno, count(*) as dept_count
  from emp
  group by deptno)
ORGANIZATION EXTERNAL (TABLE DEPT_COUNT)
select e.ename as employee_name,
  dc.dept_count as emp_dept_count
from emp e, dept_count dc
where e.deptno=dc.deptno In the aforementioned exemplary main query, the subquery is included in a parenthesis below a with as clause and an expression "ORGANIZATION EXTERNAL" may correspond to an "indication to independently manage the processing result for the subquery" used in the present specification. Further, an expression "(TABLE DEPT_COUNT)" represents that the storing type is the "internal storing type (table form storing)" and a table name in which the result data is stored is DEPT_COUNT.

Referring to FIG. 3, the query parsing module 220 of the database server 120 parses the received main query to identify the indication to independently manage the processing result for the subquery in the received main query (320). The query parsing module 220 may identify the indications included in the aforementioned exemplary main query. Further, the query parsing module 220 may detect output scheme information and/or output position information for the subquery processing result included in the indication. For example, the query parsing module 220 determines whether a previously stored expression is present by analyzing the main query (and subquery) to identify the presence of the indications.

In an additional aspect of the present disclosure, the query parsing module 220 (alternatively, operation executing module 230) may determine whether the subquery included in the main query is not included in the WITH clause or the main query including the subquery does not have the WITH clause. In this case, when the query parsing module 220 (alternatively, operation executing module 230) determines that the subquery included in the main query is not included in the WITH clause or the main query including the subquery does not have the WITH clause, the query parsing module 220 may generate information for automatically moving a specific subquery to the WITH clause or requesting moving the specific subquery to the WITH clause based on selection of the DBA.

Then, the storing type determining module 240 of the database server 120 may determine the storing type for independently storing the processing result for the subquery based on the indications identified by the query parsing module 220 (330). For example, the storing type may include an internal storing type that stores the processing result in the DB such as the memory in a table form or an in-memory column form and an external storing type that stores the processing result in the persistent storage such as the disk in the file form. In the aforementioned example, the storing type determining module 240 of the database server 120 may determine individually storing the processing result for the corresponding subquery according to the internal storing type in response to detection of an expression "TABLE" in an indication ORGANIZATION EXTERNAL (TABLE DEPT_COUNT). Further, in the aforementioned example, the storing type determining module 240 of the database server 120 may determine individually storing the processing result for the corresponding subquery according to the external storing type and distinguishing the respective column values by/in storing the processing result as the file, in response to detection of an expression "DEFAULT DIRECTORY" in an indication ORGANIZATION EXTERNAL (DEFAULT DIRECTORY def_dir ACCESS PARAMETERS (fields terminated by '/') LOCATION (dir1, 'dept.dat')).

In an additional exemplary embodiment, operations of the storing type determining module 240 of the database server 120 may be performed by the query parsing module 220 and/or operation executing module 230.

The operation executing module 230 and/or the storage module 250 of the database server 120 may perform storing operations for independently outputting the processing result for the subquery included in the main query while performing the processing for the main query, based on the storing type determined by the storing type determining module 240 (340). In the aforementioned example, while the operation executing module 230 of the database server 120 performs the processing for the main query, the storage module 250 may store the processing result data for the subquery in a directory def_dir of the external file storage in a file form (a file name: dept.dat), based on an indication ORGANIZATION EXTERNAL (DEFAULT DIRECTORY def_dir ACCESS PARAMETERS (fields terminated by '/') LOCATION (dir1, 'dept.dat')). Furthermore, the storage module 250 may use the access parameter of the external table and distinguish each column value by/and store the processing result in storing the processing result as the file. Further, when a split key is added, the storage module 250 may individually generate and store the file name by the unit of the column value.

In the exemplary embodiment, an indication to store/output the subquery processing result while separating the subquery processing result from the main query processing result may include external file storing place information (e.g., DIRECTORY def_dir) for the subquery processing result and/or file name information (e.g., dept.dat) for the subquery processing result. Therefore, the external file storage may be determined by the external file storing place information.

Additionally, the operation executing module 230 and/or the storage module 250 of the database server 120 may store in the meta table the meta information such as the storage position information for the subquery, the SQL statement information for the subquery, the time information when the processing result for the subquery is generated, and the snapshot information for the processing result of the subquery in order to permit the processing result for the subquery which is independently stored to be reused. Therefore, independently reusing the result for the corresponding subquery may be permitted by using the meta table.

The operation executing module 230 and/or the storage module 250 of the database server 120 may generate in the memory the meta table for independently storing the intermediate result of the processing for the subquery and store the intermediate result of the processing for the subquery in the generated meta table. Therefore, even before the processing for the main query or the processing for the subquery is completed, at least a part of the processing result for the subquery may be stored in the meta table. A time of generating/storing the intermediate result may be determined based on an input from the DBA and/or a predetermined period.

Figure 4:
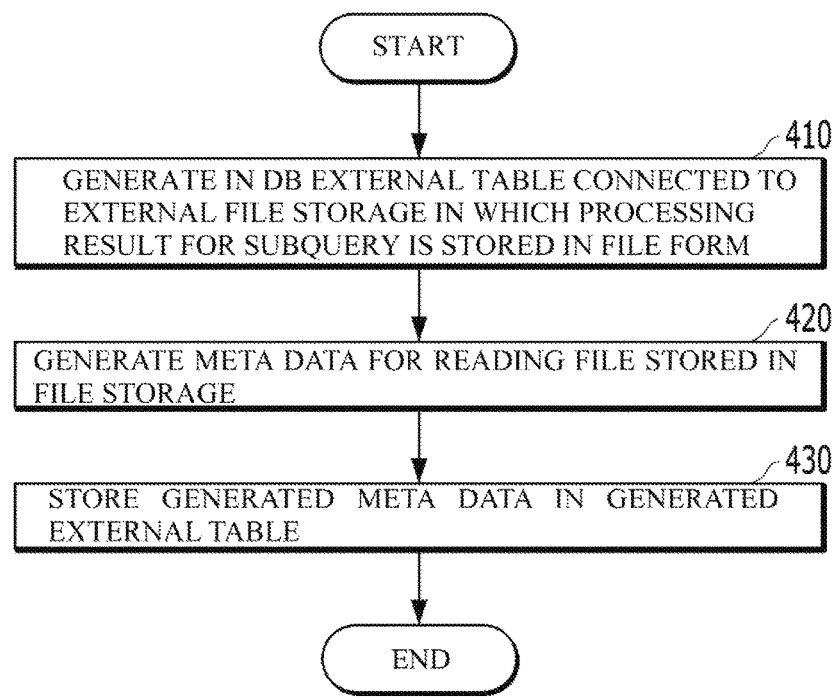
FIG. 4 is a flowchart of a method for processing a query according to an exemplary embodiment of the present disclosure.

FIG. 4 is a flowchart of a method for processing a query according to an exemplary embodiment of the present disclosure. In more detail, FIG. 4 is a flowchart of an exemplary query processing scheme when the determined storing type is the external storing type. Steps illustrated in FIG. 4 may be performed by for example, the database server 120. The steps illustrated in FIG. 4 are exemplary and additional steps may be included or at least some steps may be omitted. Description of features which are duplicated with the features mentioned above in FIG. 3 will be omitted in FIG. 4.

Referring to FIG. 4, the table generating module 260 of the database server 120 may generate in the memory the external table which may be connected with the external file storage in which the processing result for the subquery is stored in the file form (410). Sine the file-form storing/output is a simple file-form storing/output function, it may be advantageous in that the file-form storing/output may be simply processed without giving a burden to the DB. As described above, in the case of the external storing type, data is stored and output outside the DB (that is, the external file storage) such as the persistent storage in the file form. In this case, in order to reuse the corresponding result later, a result file needs to be read from the DB. Therefore, when the storing type is determined as the external storing type, the external table for reading information in the external file storage may be generated in the DB.

The meta data generating module 270 of the database server 120 may generate the meta data for reading the file stored in the external file storage (420). The meta data may include the external file storage position information (e.g., DIRECTORY def_dir) and the file name information (e.g., dept.dat). Additionally, the meta data may include, for example, the storage position information for the stored subquery, the SQL statement information for the subquery, the time information when the processing result for the subquery is generated, the intermediate result information of the subquery processing result, and the snapshot information for the processing result of the subquery, but is not limited thereto.

Then, the storage module 250 of the database server 120 may store the generated meta data in the external table (430). The external table may store the meta data (access parameter) required for connection with the external file storage and/or reading the file from the external file storage. As one example, the external table may be a read-only table.

Additionally, steps illustrated in FIG. 4 may be performed by the operation executing module 230 and/or the storage module 250 of the database server 120.

Figure 5:
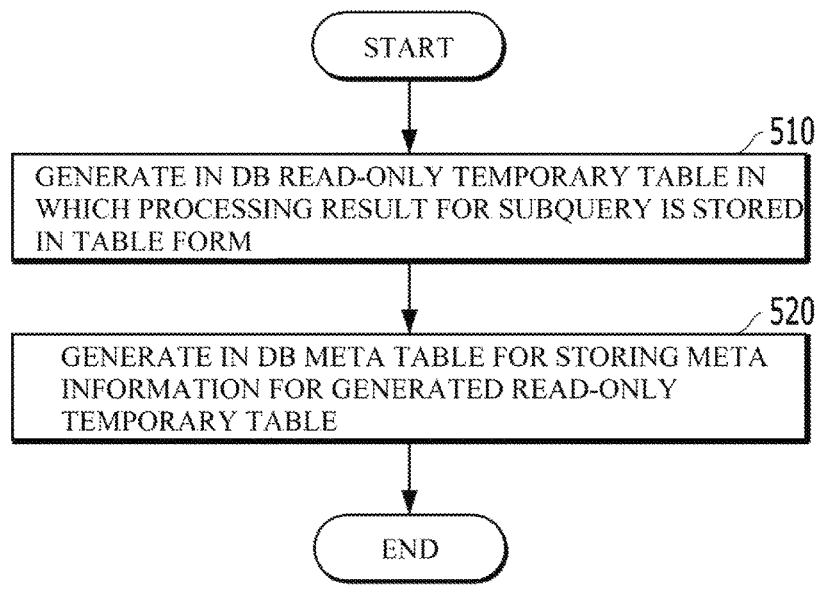
FIG. 5 is a flowchart of a method for processing a query according to an exemplary embodiment of the present disclosure.

FIG. 5 is a flowchart of a method for processing a query according to an exemplary embodiment of the present disclosure. In more detail. FIG. 5 is a flowchart of an exemplary query processing scheme when the determined storing type is the external storing type. Steps illustrated in FIG. 5 may be performed by for example, the database server 120. The steps illustrated in FIG. 5 are exemplary and additional steps may be included or at least some steps may be omitted. Description of features which are duplicated with the features mentioned above in FIGS. 3 and 4 will be omitted in FIG. 5.

Referring to FIG. 5, the table generating module 260 of the database server 120 may generate in the memory a table in which the processing result for the subquery is stored in the table form or the in-memory column form (510). The table may include the read-only temporary table. Since the table is the read-only temporary table, updating the corresponding table may be prevented and an interfacing problem caused by long maintenance may also be prevented. Table-form storing/output may be advantageous in that parallel processing is available.

In the internal storing type, the data is stored and output in the DB in the table form or the in-memory column form. In this case, a meta table for storing meta information for the generated read-only temporary table may be generated in the DB. The meta table may be substituted with the read-only temporary table. The meta information may include, for example, the storage position information for the stored subquery, the SQL statement information for the subquery, the time information when the processing result for the subquery is generated, the intermediate result information of the subquery processing result, and/or the snapshot information for the processing result of the subquery as described in FIG. 4, but is not limited thereto. The corresponding subquery processing result may be reused through the meta information. Further, intermediate result data for the subquery processing may also be stored as the meta information.

The query processing technique according to the exemplary embodiment of the present disclosure described above may be easy, for example, when an intermediate subquery result is verified for query debugging. Further, the query processing technique according to the exemplary embodiment of the present disclosure is advantageous in that since the subquery result may be generated by using a present function in a first query of a query set without the need of separately performing and generating a result for a subquery which is frequently used in the query set, the subquery result may be efficiently used in the subsequent query (subquery). Further, the query processing technique according to the exemplary embodiment of the present disclosure may be advantageous when the same filter condition is continuously used in the query set. Moreover, the query processing technique according to the exemplary embodiment of the present disclosure may achieve an effect to set group by in advance when functions such as Split keys and print columns are used. Further, when the internal storing type is in-memory column-form storing/output, it is advantageous in that a specific result may be stored and used for each column so as to acquire an effect of a columnar DB in not the columnar DB but the relational DB.

Although the external storing type and the internal storing type are separately described in FIGS. 4 and 5, a technique that simultaneously implements the external storing type and the internal storing type may also be included in the claims of the present disclosure. That is, steps according to the external storing type and the internal storing type may be simultaneously implemented in parallel to each other.

Figure 6:
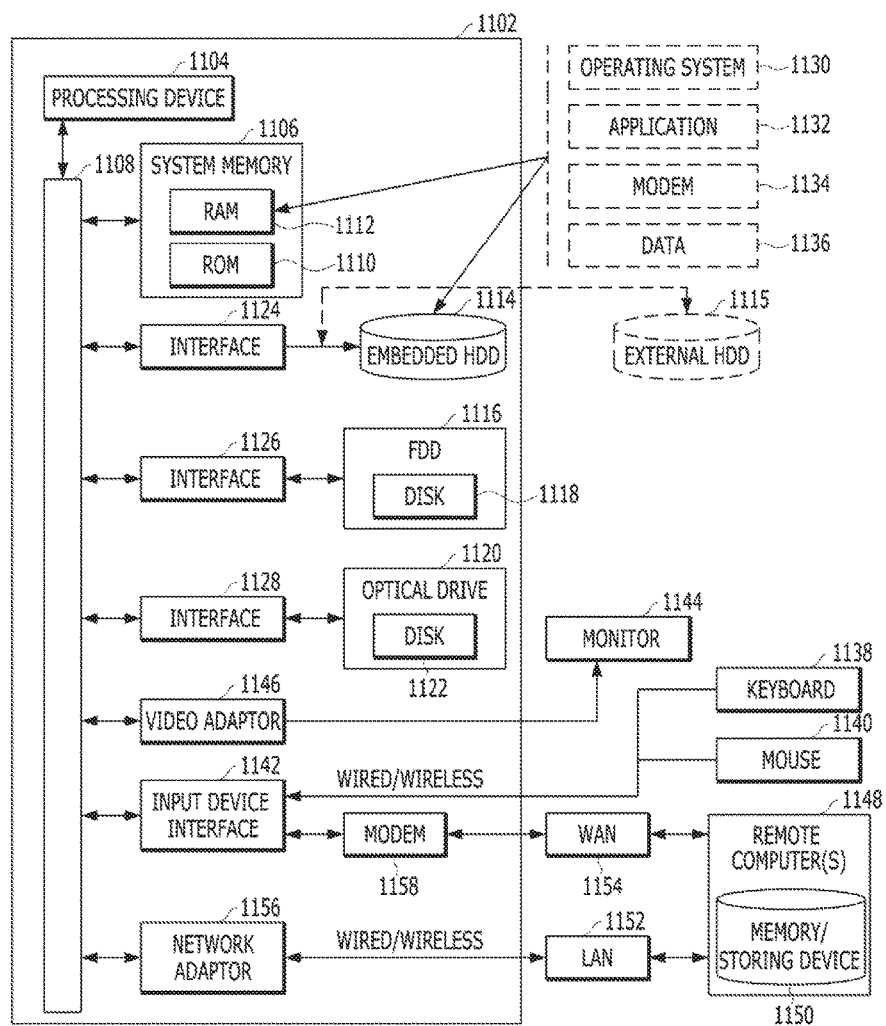
FIG. 6 is a simple and general schematic view of an exemplary computing environment of a database server in which exemplary embodiments of the present disclosure can be implemented.

FIG. 6 is a simple and general schematic view of an exemplary computing environment of a database server in which exemplary embodiments of the present disclosure can be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable medium may include both a computer storage medium and a communication medium. The computer storage medium includes volatile and non-volatile, temporary or non-temporary, movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The communication media generally implement the computer readable command, the data structure, the program module, or other data in a carrier wave or a modulated data signal such as other transport mechanism and include all information transfer media. The term modulated data signal means a signal acquired by configuring or changing at least one of characteristics of the signal so as to encode information in the signal. As not a limit but an example, the communication media include wired media such as a wired network or a direct-wired connection and wireless media such as acoustic, RF, infrared and other wireless media. A combination of any media among the aforementioned media is also included in a range of the computer readable media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an embedded hard disk drive (HDD) 1114 (for example, EIDE and SATA)—the embedded hard disk drive (HDD) 1114 may also be configured for an exterior purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired wireless input devices, for example, pointing devices such as a keyboard 1138 and a mouse 1140. Other input devices (not illustrated) may include a microphone, an IR remote controller, a joystick, a game pad, a stylus pen, a touch screen, and others. The devices and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as an Intranet, and the like and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication server on the WAN 1154 or connection through the Internet. The modem 1158 which may be an embedded or exterior and wired or wireless device is connected to the system bus 1108 through the serial port interface 1142. In the networked environment, the program modules described with respect to the computer 1102 or some thereof may be stored in the remote memory/storage device 1150. The illustrated network connection is exemplary and it will be well appreciated that other means configuring a communication link among computers may be used.

The computer 1102 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes Wi-Fi and a Bluetooth wireless technology. Accordingly, communication may be a predefined structure like the network in the related art or just ad hoc communication between at least two devices.

Wireless fidelity (Wi-Fi) enables connection to the Internet, and the like without a wired cable. Wi-Fi is a wireless technology such as a device, for example a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. Wi-Fi may be used to connect computers to each other or the Internet and a wired network (using IEEE 802.3 or Ethernet). The Wi-Fi network may operate, for example, at a data rate of 11 Mbps(802.11a) or 54 Mbps(802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" includes a wireless channel and various other media that can store, posses, and/or transfer command(s) and/or data, but is not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is consistent with the principles and new features presented herein.

What is claimed is:

1. A method for processing a query in a database management system (DBMS), the method comprising:
   receiving a main query including a subquery;
   identifying an indication to independently manage a processing result of the subquery in the received main query by parsing the received main query—the indication including storing type information for the processing result of the subquery;
   determining a storing type for independently storing the processing result of the subquery based on the indication, wherein when the determined storing type is determined to be an external storing type, an external file storage in which the processing result of the subquery is to be stored in a file form is determined, an external table connected to the determined external file storage in a memory is generated, meta data for reading a file stored in the external file storage is generated, and the generated meta data is stored in the generated external table;
   processing the received main query and the subquery; and
   storing the processing result of the subquery independently from a processing result of the received main query during the processing of the received main query according to the determined storing type.

2. The method of claim 1, wherein the received main query includes a WITH clause, and the subquery is included in the WITH clause.

3. The method of claim 2, wherein the indication is included in a statement expressed outside the subquery in the WITH clause.

4. The method of claim 2, further comprising:
   generating information for requesting whether the subquery is to move to the WITH clause when it is determined that the subquery included in the received main query is not included in the WITH clause or when the received main query including the subquery does not have the WITH clause by parsing the received main query.

5. The method of claim 1, wherein the indication further includes external file storage position information for the processing result of the subquery and file name information for the processing result of the subquery, and the external file storage is determined based on the external file storage position information and the meta data is generated based on the external file storage position information and the file name information.

6. The method of claim 1, further comprising:
   when the determined storing type is determined to be an internal storing type,
   generating in a memory a read-only temporary table in which the processing result of the subquery is to be stored in a table form.

7. The method of claim 6, wherein the indication further includes at least one of internal file storage position information for the processing result of the subquery and table name information for the processing result of the subquery.

8. The method of claim 1, further comprising:
   in order to permit the processing result of the subquery to be reused,
   generating a meta table for storing at least one of storage position information of the subquery, structured query language (SQL) statement information of the subquery, time information when the processing result of the subquery is generated, and snapshot information for the processing result of the subquery.

9. The method of claim 1, wherein the storing of the processing result of the subquery independently from the processing result for the received main query includes:
   generating, in a memory, a meta table for independently storing an intermediate result for the processing of the subquery, and
   storing the intermediate result for the processing of the subquery in the generated meta table.

10. A non-transitory computer-readable recording medium including a computer program configured to perform operations for query processing in a database management system (DBMS) when the computer program is executed by one or more processors, the operations comprising:
    receiving a main query including a subquery;
    identifying an indication to independently manage a processing result of the subquery in the received main query by parsing the received main query—the indication including storing type information for the processing result of the subquery;
    determining a storing type for independently storing the processing result of the subquery based on the indication, wherein when the determined storing type is determined to be an external storing type, an external file storage in which the processing result of the subquery is to be stored in a file form is determined, an external table connected to the determined external file storage in a memory is generated, meta data for reading a file stored in the external file storage is generated, and the generated meta data is stored in the generated external table;
    processing the received main query and the subquery; and
    storing the processing result of the subquery independently from a processing result of the received main query during the processing of the received main query according to the determined storing type.

11. A server for processing a query in a database management system (DBMS), the server comprising:
    a communicator configured to receive a main query including a subquery;
    a query parser configured to identify an indication to independently manage a processing result of the subquery in the received main query by parsing the received main query—the indication including storing type information for the processing result of the subquery;
    a storing type determiner configured to determine a storing type for independently storing the processing result of the subquery based on the indication, wherein when the determined storing type is determined to be an external storing type, an external file storage in which the processing result of the subquery is to be stored in a file form is determined, an external table connected to the determined external file storage in a memory is generated, meta data for reading a file stored in the external file storage is generated, and the generated meta data is stored in the generated external table;

an operation executor configured to process the received main query and the subquery; and a storer configured to store the processing result of the subquery independently from a processing result of the received main query during the processing of the received main query according to the determined storing type.

* * * * *